Sept. 25, 1962     A. L. KIRKWOOD     3,055,709
AUXILIARY BOX FOR VEHICLES
Filed Nov. 21, 1960     2 Sheets-Sheet 1
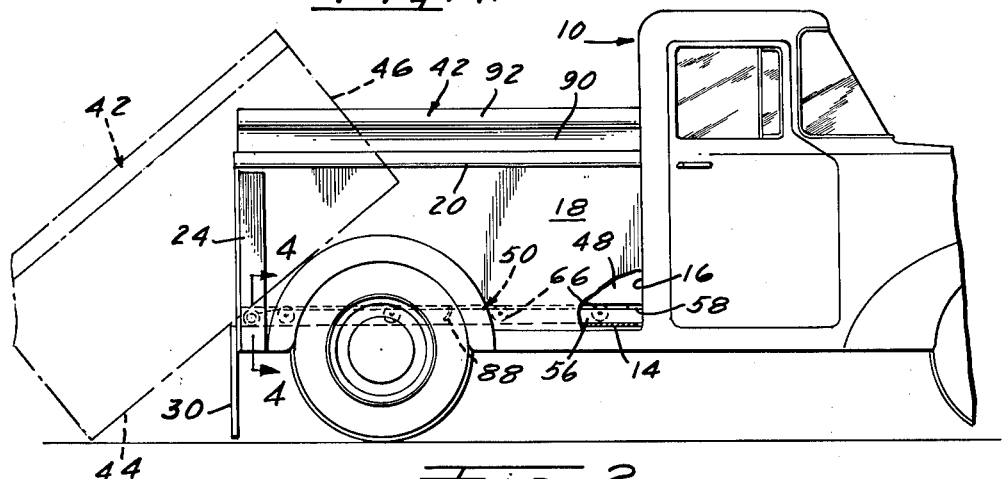
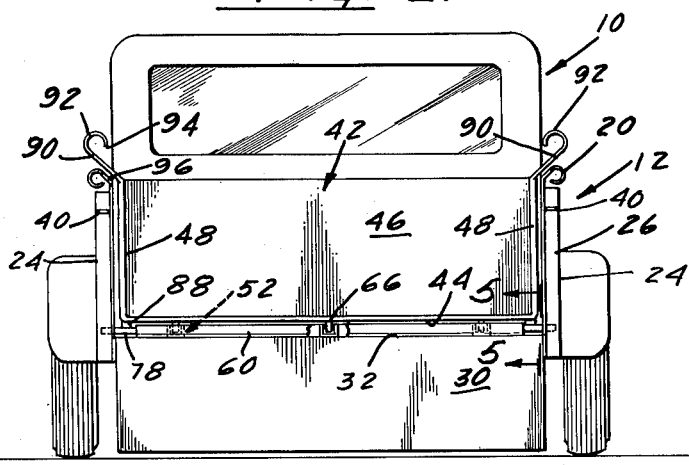
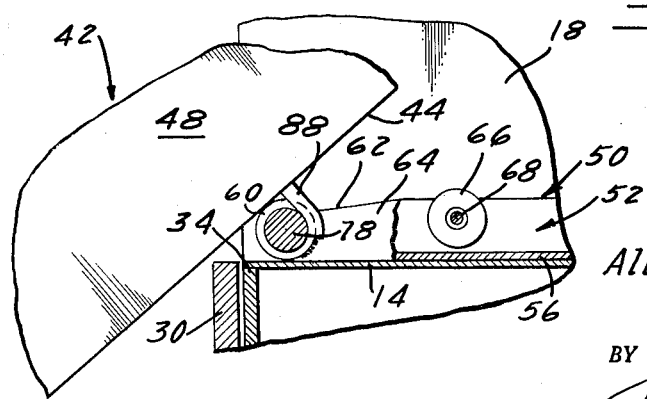
Albert L. Kirkwood,
INVENTOR.
BY
Attorney Sept. 25, 1962  A. L. KIRKWOOD  3,055,709
AUXILIARY BOX FOR VEHICLES
Filed Nov. 21, 1960  2 Sheets-Sheet 2
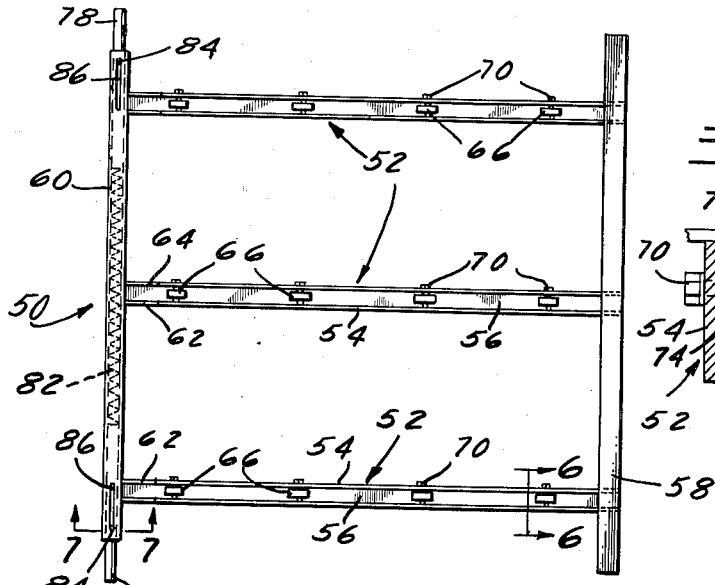
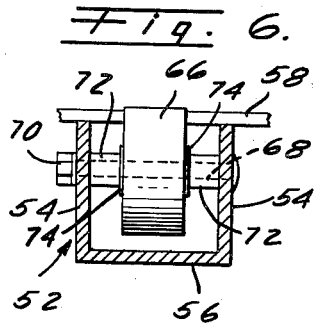
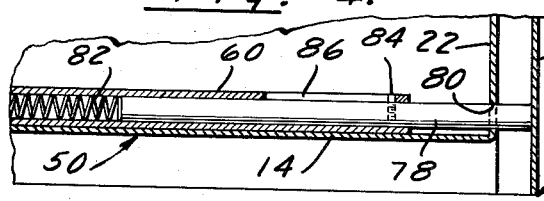
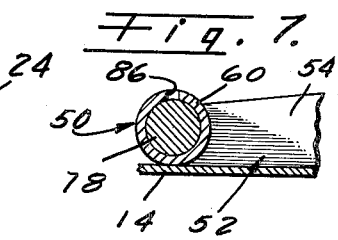
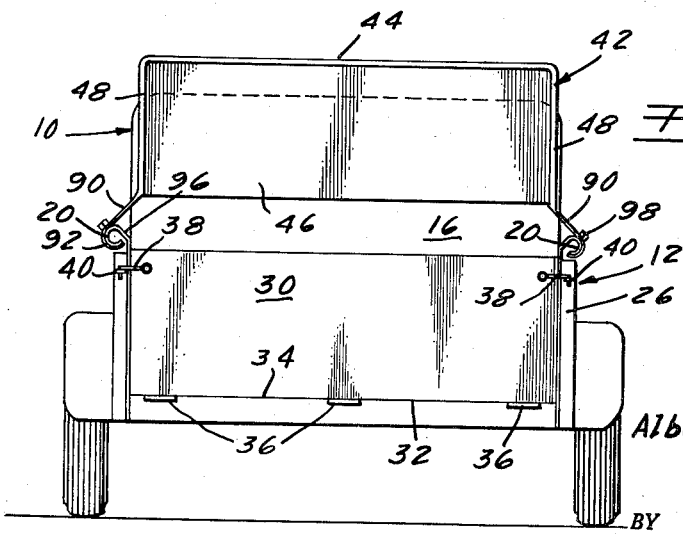
Albert L. Kirkwood,
INVENTOR.
BY
Attorney United States Patent Office 3,055,709
Patented Sept. 25, 1962

3,055,709
AUXILIARY BOX FOR VEHICLES
Albert L. Kirkwood, 1261 Russell St., La Habra, Calif.
Filed Nov. 21, 1960, Ser. No. 70,689
3 Claims. (Cl. 298—1)

This invention relates generally to automotive vehicles, and relates more particularly to a multi-purpose auxiliary body.

While the invention has particular utility in connection with pickup trucks, and is shown and described in such connection, it is to be understood that its utility is not confined thereto.

It is an object of the present invention to provide an auxiliary body that will greatly increase the usefulness of pickup trucks.

Another object of the invention is to provide an auxiliary body having a dumping function.

Still another object of the invention is to provide a device of this character which may be easily and quickly installed or incorporated in pickup trucks now in use.

A further object of the invention is to provide means of this character wherein installation thereof in pickup trucks now in use may be made with very slight or minor alterations in such pickup trucks.

A still further object of the invention is to provide apparatus of this character wherein the truck's tail gate, which is standard equipment, serves as a closure for the rear end of the auxiliary body, thereby eliminating the necessity for providing a separate tail gate for said body.

Another object of the invention is to provide apparatus of this character wherein the auxiliary body supporting means may be easily and quickly removed from the pickup truck body when the auxiliary body is not required.

It is still another object of the invention to provide an auxiliary body which may be used as a camper attachment.

A further object of the invention is to provide an auxiliary body which, when used as a camper, is easily and quickly attached or removed from the body of pickup trucks now in use.

A still further object of the invention is to provide apparatus of this character that is relatively simple in construction and operation.

Another object of the invention is to provide apparatus of this character that is relatively inexpensive to manufacture.

The characteristics and advantages of the invention are further sufficiently referred to in connection with the following detailed description of the accompanying drawings, which represent one arrangement.

After considering this example, skilled persons will understand that variations may be made without departing from the principles disclosed, and I contemplate the employment of any structures, arrangements, or modes of operation that are properly within the scope of the appended claims.

Referring to the drawings, which are for illustrative purposes only:

FIG. 1 is a side view of a pickup truck in which the present apparatus is incorporated;

FIG. 2 is a rear end view of the same;

FIG. 3 is a top plan view of the auxiliary body supporting mechanism;

FIG. 4 is an enlarged sectional view taken on line 4—4 of FIG. 1;

FIG. 5 is an enlarged fragmentary section taken on line 5—5 of FIG. 2, showing the auxiliary body in the dumping position;

FIG. 6 is an enlarged sectional view taken on line 6—6 of FIG. 3;

FIG. 7 is an enlarged sectional view taken on line 7—7 of FIG. 3; and

FIG. 8 is a rear view of the truck showing the auxiliary body installed as a camper.

Referring more particularly to the drawings, there is shown a pickup truck, indicated generally at 10. The truck has the usual box, indicated generally at 12, including a bottom 14, a front wall 16, and side walls 18 which have rolled upper edges 20. At the rear ends of the sides or side walls 18 are the usual vertically arranged stake receptacles which include inner walls 22, outer walls 24 and rear walls 26, said receptacles being open at the top. The rear end of the box 12 is provided with a tail gate 30 hinged along the bottom edge 32 to the rear transverse edge 34 of the box 12 by means of hinges 36. The tail gate is releasably secured in the closed position by any suitable well known means, such as hooks 38 secured to said tail gate in the usual well known manner and adapted to be removably hooked into eye members 40 secured to the rear wall 26 of the stake receptacles.

The auxiliary body or box, indicated generally at 42, comprises a bottom 44, front wall 46, and sides or side walls 48, the rear of said auxiliary box being open. The auxiliary box may be of any suitable material, being shown as formed of sheet metal.

Means for supporting the auxiliary box 42 is provided, said means being indicated generally at 50. Support means 50 comprises a frame having plurality of longitudinally extending channel members, indicated generally at 52, which are generally U-shaped in cross-section. Channel members 52 have laterally spaced substantially parallel sides 54 joined together along their lower edges by a bottom 56.

Although any suitable number of channel members 52 may be used, three are shown herein and are secured together in laterally spaced, apparallel relationship by means of a transverse bar 58 at their forward ends, said bar being secured to said channel members by welding or other suitable means. Bar 58 is of such length as to fit in the truck box 12 between the side wall 18 and retain the forward end of the auxiliary box supporting means against lateral displacement.

At the rear ends said channel members are secured, by welding or other suitable means, to a transversely extending tube 60, it being noted that the upper edges 62 of the rear end portions 64 of the channel members 52 are inclined downwardly and rearwardly to permit proper dumping movement of the auxiliary box 42.

In order to provide for rolling support for the auxiliary box 42 each channel member 52 is provided with a plurality of rollers 66 operably disposed between the sides 54 of said members 52. Each roller 66 is rotatably mounted on a bolt 68 received in axially aligned openings, not shown in the sides 54, said bolt being secured in place by a nut 70. In order to retain the roller centrally between the sides 54 of the respective channel members there are spacing sleeves 72 disposed on the bolt 68 at the respective sides of the roller. Washers 74 are disposed on the bolt 68 between the inner ends of the sleeves 72 and adjacent sides of the rollers. It is to be noted that the rear roller in each channel member is positioned close to and forwardly of the forward end of the rear end portions 62 of the channel members. Means for releasably securing the auxiliary box supporting means is provided and comprises a rod or latching bolt 78 in each end of the tube 60.

The free ends of the tube 60 are spaced inwardly from the inner sides 22 of the stake receptacles and in axial alignment with axially aligned openings 80 in said sides 22. Thus the latching bolts 78 are also in axial alignment with said openings 80 and are longitudinally slidable in the tube 60 into and out of said openings 80.

Latching bolts 78 are yieldingly urged outwardly of the tube 60 by a spring 82 disposed in tube 60 between the inner ends of said bolts 78 so that when the auxiliary box support is in operative position in the box 12 of the pickup truck said latching bolts 78 are retained in said openings 80 by said spring, thereby retaining said auxiliary box support securely in said operative position. Other arrangements may, of course, be used to retain the bolts 78 in position in the openings 80.

Means is also provided to retain the bolts 78 in the tube 60 when the auxiliary box supporting means is out of the truck box 12 so that said bolts will not be lost. One such means is shown for each bolt 78 and comprises a screw 84 slidably disposed in a slot 86 provided therefor and extending longitudinally of the tube.

When the auxiliary box supporting means is installed in the truck box the bolts 78 are retracted and, when said support means is in operative position, said bolts are released to permit the spring 82 to move same into the openings 80. To release the latching means for the auxiliary box, the bolts 78 are retracted to remove them from the openings 80 and the entire auxiliary support means then lifted or otherwise removed from the truck box 12. The bolts 78 may be retracted by grasping them by hand or with any suitable type of tool, such as a pliers, for example.

When using the auxiliary box as a dump box, said auxiliary box is slid into the truck box, after the support means has been placed in the latter, said auxiliary box is slid into the truck box, after the support means has been placed in the latter, said auxiliary box rolling on said rollers 66. The closed end of the auxiliary box is at the front of the truck box and the tail gate of the truck closes the open rear end of the auxiliary box as well as the rear end of the truck box. The auxiliary box is loaded so as to be somewhat heavier at the rear than at the front and when it is desired to dump the load, the tail gate is unhooked and swung to its depending position, as shown in FIGS. 1, 2 and 5. The auxiliary box is then moved rearwardly on the rollers 66 to a predetermined position whereat hooks 88 depending from the under side of the auxiliary box bottom 44 engage the parts of the bolts 78 between the free ends of the tube 60 and adjacent sides 22 of the stake receptacle. As the auxiliary box reaches this position it is over-balanced at its rear end and will swing to the dumping position, shown in dotted lines in FIG. 1 and in full lines in FIG. 5. Hooks 88 are secured to the bottom 44 of the auxiliary box by any suitable means such as brazing, rivets, bolts or the like.

The inclination of the top edges 62 of the channel members 52 provide clearance for the bottom of the auxiliary box when dumping and returning said box into the truck box. It is to be noted, FIG. 5, that the bottom of the auxiliary box pivots on the tube 60 when moving from the horizontal position to the dumping position and back to the horizontal position. Also, it is to be noted that the top of the tube is at the horizontal plane of the top edges of the sides 54 of the channel members 52, said plane being tangential to the uppermost part of said tube.

The auxiliary box may also be used as a camper and for this purpose there is provided upwardly and outwardly inclined extensions 90 of the sides or side walls 48 of said auxiliary box. The upper edge portions of said extensions are curved inwardly and somewhat downwardly to form a rolled tubular portion 92. The free edges 94 of the rolled or tubular portion 92 are spaced upwardly from the adjacent surface of the extensions. With this arrangement the auxiliary box may be turned upsidedown and the tubular portions 92 slipped telescopically onto the rolled edges 20 of the truck box, the upwardly and outwardly inclined parts 96 of the rolled edges 20 being received in the space between the free edges 94 of the tubular portions 92 and adjacent parts of the extensions 90. Thus the auxiliary box serves as a top from the truck box, and said auxiliary box is releasably secured in this position by any suitable means. For example, screws 98 may be screwed into aligned openings, not shown, provided therefor in the tubular portions 92 and rolled edge portions 20, the openings in the latter being tapped. To remove the auxiliary box the screws 98 are removed and said auxiliary box pulled rearwardly from the rolled edges 20.

From the foregoing it will be apparent that the present invention provides a complementary box for a truck which increases the utility of the truck.

The invention and many of its attendant advantages will be understood from the foregoing description and it will be apparent that various changes may be made in the form, construction, and arrangement of the parts of the invention without departing from the spirit and scope thereof or sacrificing its material advantages, the form hereinbefore described being used merely by way of example.

It is also to be noted that the extensions 90 increase the capacity of the auxiliary box.

I claim:

1. The combination of a pickup truck having a box including a bottom and side walls having rolled upper edges extending longitudinally thereof; a tail gate operably hinged to the rear of said box; means for releasably securing said tail gate in the closed position; an auxiliary box including a bottom, side walls, and extensions on the upper edges of said side walls, said extensions being inclined outwardly and terminating in tubular portions telescopically receivable on the rolled upper edges of the sides of the truck body to thereby position said auxiliary box invertedly on the truck box.

2. In an invertable auxiliary box for truck boxes: a bottom; side walls; and means on the auxiliary box engageable with portions of a truck box when the auxiliary box is in the inverted position for removably attaching said auxiliary box to said truck box.

3. The combination of a truck having a body including a bottom and parallel side walls with rolled upper edges extending longitudinally thereof; an auxiliary box including a bottom, parallel side walls, and extensions on the upper edges of said side walls, said extensions terminating in tubular portions telescopically receivable on the rolled upper edges of the sides of the truck body to thereby secure said auxiliary box invertedly on the truck box.

References Cited in the file of this patent

UNITED STATES PATENTS

| | | |
|---|---|---|
| 2,148,245 | Runkle | Feb. 21, 1939 |
| 2,529,558 | Klingerbiel | Nov. 14, 1950 |